United States Patent [19]
Marot et al.

[11] Patent Number: 5,549,733
[45] Date of Patent: Aug. 27, 1996

[54] PROCESS FOR THE PRODUCTION OF A GAS BY ADSORPTION

[75] Inventors: Christine Marot, Versailles; Pierre Petit, Chatenay Malabry; Xavier Vigor, Viroflay, all of France

[73] Assignee: L'Air Liquide, Societe Anonyme pour l'Etude et l'Exploitation des Procedes Georges Claude, Paris Cedex, France

[21] Appl. No.: 410,310

[22] Filed: Mar. 24, 1995

[30] Foreign Application Priority Data

Mar. 30, 1994 [FR] France .................... 94.03782

[51] Int. Cl.$^6$ .................................. B01D 53/047
[52] U.S. Cl. .................. 95/100; 95/101; 95/105; 95/130
[58] Field of Search .............. 95/96, 98, 100–105, 95/130

[56] References Cited

U.S. PATENT DOCUMENTS

| | | | |
|---|---|---|---|
| 3,176,444 | 4/1965 | Kiyonaga | 95/96 |
| 3,430,418 | 3/1969 | Wagner | 95/100 |
| 3,564,816 | 2/1971 | Batta | 95/100 |
| 3,636,679 | 1/1972 | Batta | 95/100 |
| 4,077,780 | 3/1978 | Doshi | 95/100 |
| 4,650,501 | 3/1987 | Hiscock et al. | 95/100 |
| 4,834,780 | 5/1989 | Benkmann | 95/98 |
| 4,840,647 | 6/1989 | Hay | 95/100 |
| 4,969,935 | 11/1990 | Hay | 95/98 |
| 4,981,499 | 1/1991 | Hay et al. | 95/100 |
| 5,015,271 | 5/1991 | Reiss | 95/96 X |
| 5,203,888 | 4/1993 | Maurer | 95/101 |
| 5,246,676 | 9/1993 | Hay | 95/98 X |
| 5,250,088 | 10/1993 | Yamaguchi et al. | 95/98 |
| 5,254,154 | 10/1993 | Gauthier et al. | 95/100 X |
| 5,294,247 | 3/1994 | Scharpf et al. | 95/101 |
| 5,328,503 | 7/1994 | Kumar et al. | 95/101 |
| 5,330,561 | 7/1994 | Kumar et al. | 95/130 X |
| 5,393,326 | 2/1995 | Engler et al. | 95/103 |
| 5,411,578 | 5/1995 | Watson et al. | 95/101 |
| 5,429,666 | 7/1995 | Agrawal et al. | 95/101 |

FOREIGN PATENT DOCUMENTS

| | | |
|---|---|---|
| 0248720 | 12/1987 | European Pat. Off. . |
| 0350373 | 1/1990 | European Pat. Off. . |
| 0356861 | 3/1990 | European Pat. Off. . |

*Primary Examiner*—Robert Spitzer
*Attorney, Agent, or Firm*—Young & Thompson

[57] ABSTRACT

In a "vacuum" type cycle, the depressurization of a first adsorber at the high pressure of the cycle is effected by placing it in communication with the outlet of a second adsorber at the low pressure of the cycle. This communication takes place simultaneously with countercurrent pumping in a first stage for the second adsorber and in a second stage for the first adsorber, the recompression to the high pressure of the cycle being effected by production gas. Used for the production of oxygen from air.

6 Claims, 1 Drawing Sheet

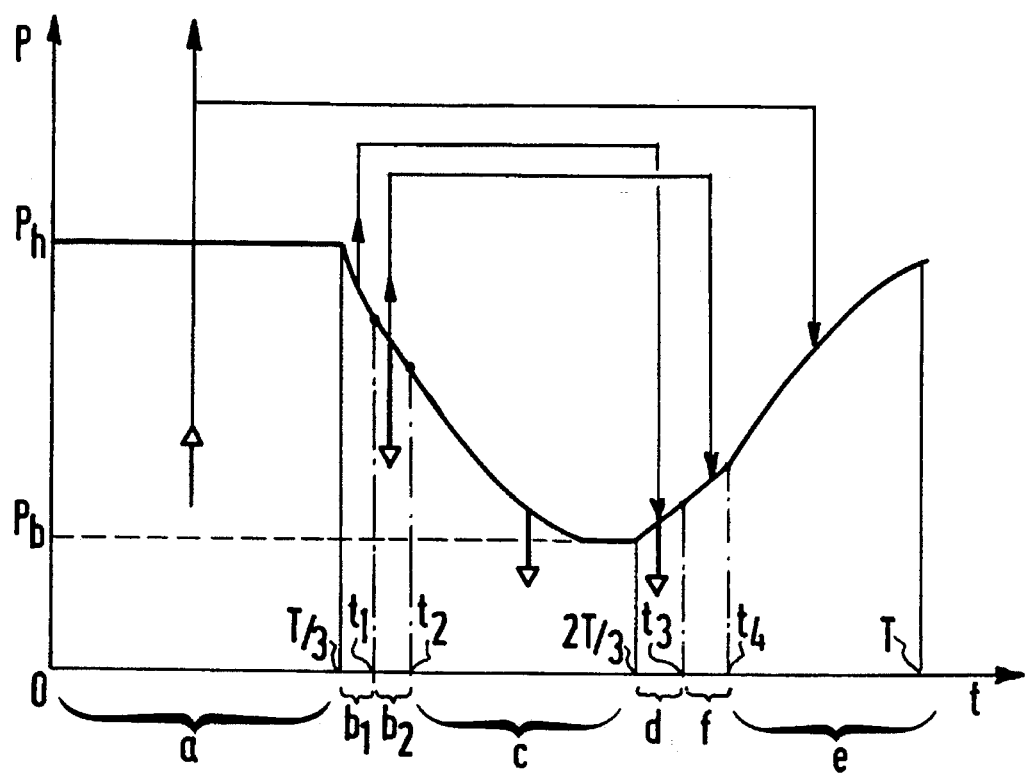

PROCESS FOR THE PRODUCTION OF A GAS BY ADSORPTION

FIELD OF THE INVENTION

The present invention relates to a process for the production of a less-easily adsorbable gas from a gaseous mixture by adsorption in an adsorption unit comprising three adsorbers and using for each adsorber a cycle comprising the following steps:

a) substantially isobaric production of said gas at the high pressure of the cycle;

b) co-current depressurization to an intermediate pressure;

c) final countercurrent depressurization to a low pressure of the cycle;

d) elution with the countercurrent admission of gas from another adsorber in phase b); and e) countercurrent recompression to the high pressure of the cycle with production gas.

BACKGROUND OF THE INVENTION

Such cycles, developed from a basic cycle described in U.S. Pat. No. 3,176,444 and comprising a fairly long elution step, are used in particular for the production of medium purity oxygen from air.

The present invention has for its object to provide a new process permitting, without any supplemental investment and by simple modification of the control regime of the cycle, obtaining substantially improved performances with a substantial reduction of specific energy consumption, particularly for the production of oxygen of a purity greater than 90%.

To do this, according to one characteristic of the invention, step b) of initial depressurization comprises a second phase $b_2$, preceding the phase c) in which the depressurization is also effected countercurrent, elution step d) being followed by a countercurrent recompression phase f) with gas from another adsorber in phase $b_2$.

According to other characteristics of the invention:

the low pressure of the cycle is less than atmospheric pressure, typically less than $0.5 \times 10^5$ Pa, the cycle pressure being typically slightly greater than atmospheric pressure;

countercurrent withdrawal in steps $b_2$, c) and d) is effected by pumping.

BRIEF DESCRIPTION OF THE DRAWINGS

Other characteristics and advantages of the present invention will become apparent from the following description of an embodiment given by way of illustration but in no way limiting, with respect to the accompanying drawing, in which:

the single figure shows schematically by a pressure/time diagram, a cycle of a process according to the invention.

DETAILED DESCRIPTION OF THE INVENTION

In the description which follows, the expression "co-current" means in the same sense as the circulation of the fluid in the production phase, the expression "countercurrent" meaning in the reverse direction from the preceding.

The cycle shown in the single figure corresponds to an installation for the production of medium purity oxygen, comprising three adsorbers whose inlets are selectively connectable to a blower for supplying a gaseous mixture to be separated and at least one vacuum pump serving for the decompression and elution phases for the regeneration of the adsorbent.

As is seen on the single figure, a cycle T comprises the following steps:

a) from t=zero to T/3, a substantially isobaric production step at the high pressure of the cycle $P_h$ of oxygen available at the outlet of the adsorber supplied at its inlet with air at a pressure $P_h$;

$b_1$) from T/3 to $t_1$, the outlet of the adsorber at the high cycle pressure is closed and its outlet is connected to the outlet of another adsorber at the low pressure $P_b$ of the cycle, whose inlet is connected to the vacuum pump, countercurrent elution, from 2T/3 to $t_3$, in this other adsorber giving rise therein to a first recompression;

$b_2$) from $t_1$ to $t_2$, the outlets of the two adsorbers in question remain in communication, but the decompression of the first adsorber takes place here also by countercurrent withdrawal by connection of its inlet to the vacuum pump which is simultaneously disconnected after $t_3$, from the other adsorber which continues, to $t_4$, its countercurrent recompression by pure gas from, as mentioned above, the first adsorber;

c) from $t_2$ to 2T/3, the final decompression step of the first adsorber to the low pressure $P_b$ of the cycle, effected solely by action of the pump;

d) from 2T/3 to $t_3$, elution/recompression with the pure product from another adsorber at the beginning of the decompression phase with simultaneous withdrawal by the pump (step $b_1$) as previously described);

f) from $t_3$ to $t_4$, countercurrent recompression with the pure product from the other adsorber in step $b_2$); and e) from $t_4$ to T, recompression to the high pressure $P_h$) of the cycle by pure product withdrawn from the production.

There is shown in the following table the comparative results obtained with a same installation of three adsorbers filled with zeolite type 5A, 13X or CaX, carrying out a cycle whose high pressure $P_h$ is $1.1 \times 10^5$ Pa absolute and the low pressure $P_b$ is $0.31 \times 10^5$ Pa absolute, for a total cycle time of 3×30 seconds, A corresponding to a cycle as defined at the beginning of the specification and B to a cycle according to the invention, the yield being defined by the ratio: quantity of oxygen produced/quantity of oxygen consumed.

| Oxygen Content | Yield % |
| --- | --- |
| 88% | A: 50% |
|  | B: 52% |
| 92% | A: 47% |
|  | B: 51% |
| 94.8% | A: 37% |
|  | B: 45% |

According to one aspect of the invention, the steps of production and of depressurization by suction are determined such that the compression means for the gaseous mixture, on the one hand, and the pumping means, on the other hand, operate continuously. Thus, as in the illustrated example, for a unit of n adsorbers and a cycle time T, the duration of steps $b_2$), c) and d) on the one hand, and a), on the other hand, is equal to k×T/h, k being a whole number greater than or equal to 1.

Although the present invention has been described with respect to a particular embodiment, it is not thereby limited but on the contrary is susceptible to modifications and variations which will be apparent to one skilled in the art.

We claim:

1. A process for the production of a less-adsorbable gas from a gaseous mixture containing said less-adsorbable gas in an adsorption system comprising three adsorbers, each adsorber subject to a pressure swing adsorption cycle comprising the following successive steps:
   a) a production step substantially at a high pressure of the cycle with co-current admission of the gaseous mixture and production of the less adsorbable gas as a product gas;
   b) a first depressurization co-current towards another adsorber in its step e);
   c) a second depressurization counter-current and simultaneously co-current towards another adsorber in its step f);
   d) a third depressurization counter-current, down to a low pressure of the cycle;
   e) an elution counter-current with gas from another adsorber in its step b);
   f) a first recompression counter-current with gas from another adsorber in its step c); and
   g) a second recompression counter-current with product gas up to substantially the high pressure of the cycle.

2. The process of claim 1, further comprising effecting the counter-current depressurization and elution in steps c), d) and e) by pumping.

3. Process according to claim 1, wherein the high pressure of the cycle is slightly greater than atmospheric pressure.

4. Process according to claim 1, wherein the duration of steps c), d) and e) is equal to $k \times T/3$, T being the total duration and k a whole number at least equal to 1.

5. Process according to claim 4, wherein the duration of step a) is equal to $k \times T/3$.

6. Process according to claim 1, wherein the gas is oxygen, and the gaseous mixture is air.

* * * * *